Figure 3:
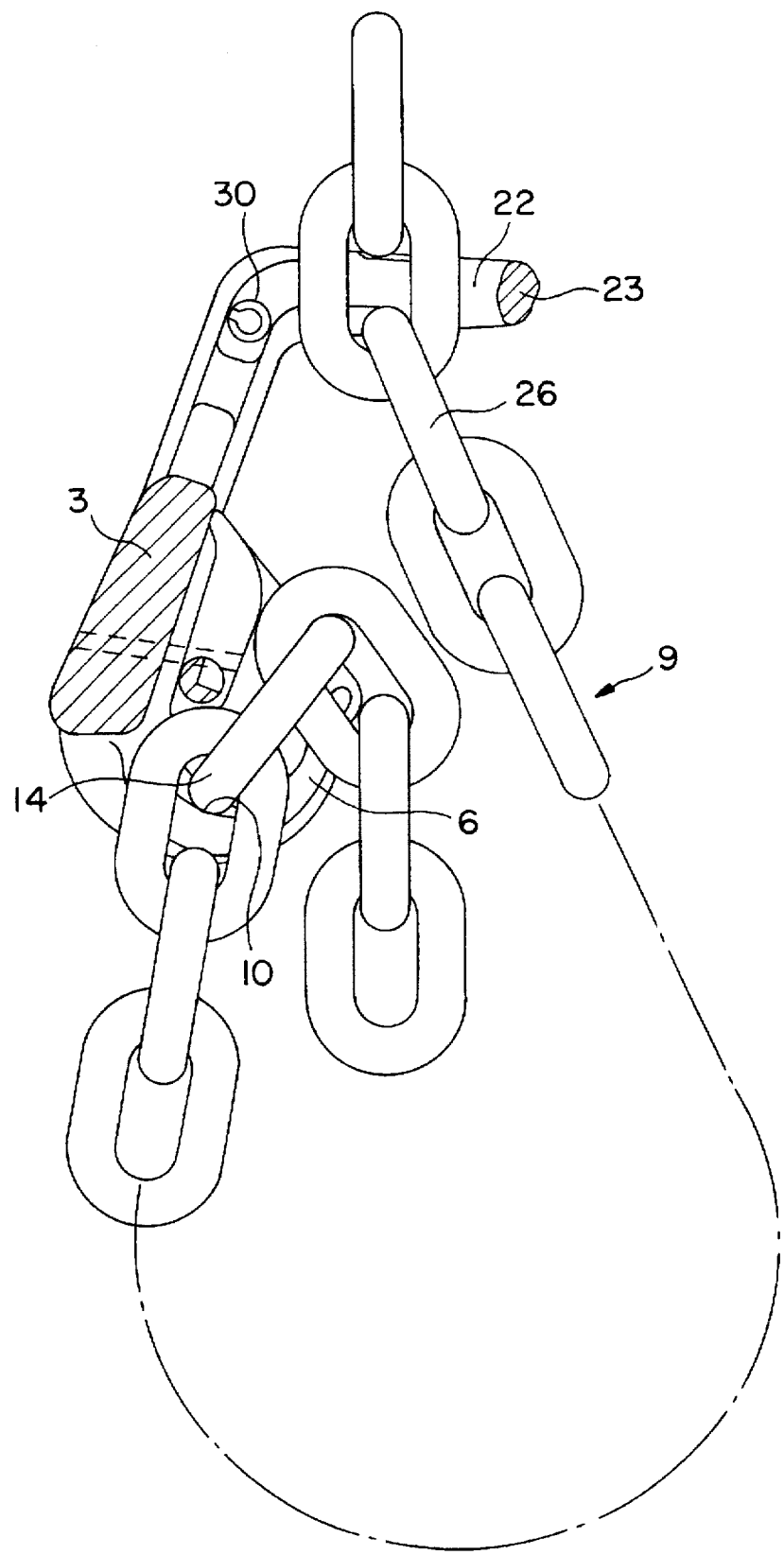

United States Patent [19]
Smetz

[11] Patent Number: 5,724,804
[45] Date of Patent: Mar. 10, 1998

[54] SHORTENING CLAW

[75] Inventor: Reinhard Smetz, Baldingen, Germany

[73] Assignee: RUD-Kettenfabrik Rieger & Dietz GmbH.u.Co., Aalen, Germany

[21] Appl. No.: 669,542

[22] PCT Filed: Dec. 22, 1994

[86] PCT No.: PCT/DE94/01539

§ 371 Date: Jul. 11, 1996

§ 102(e) Date: Jul. 11, 1996

[87] PCT Pub. No.: WO95/17620

PCT Pub. Date: Jun. 29, 1995

[30] Foreign Application Priority Data

Dec. 23, 1993 [DE] Germany .............. 43 44 935.2

[51] Int. Cl.$^6$ ........................................... F16G 17/00
[52] U.S. Cl. ........................ 59/93; 294/82.1; 24/116 R
[58] Field of Search ............................ 59/85, 86, 93; 294/82.1; 24/116 R

[56] References Cited

U.S. PATENT DOCUMENTS

| 2,978,766 | 4/1961 | Arnett | 24/116 |
| 3,333,412 | 8/1967 | Rieger | 59/93 |
| 3,601,978 | 8/1971 | Riefer | 59/93 |
| 3,729,926 | 5/1973 | Buske | 59/93 |
| 3,863,441 | 2/1975 | Kaufmann | 59/93 |
| 4,151,708 | 5/1979 | Smetz | 59/93 |
| 4,330,990 | 5/1982 | Schreyer | 59/93 |
| 5,309,706 | 5/1994 | Lasaroff et al. | 59/93 |

FOREIGN PATENT DOCUMENTS

| 0092135 | 10/1983 | European Pat. Off. . | |
| 127571 | 12/1984 | European Pat. Off. | 59/85 |
| 1270232 | 1/1961 | France . | |
| 6903899 | 5/1969 | Germany . | |
| 2712605 | 7/1982 | Germany . | |
| 4115341 | 11/1992 | Germany . | |
| 9320125 | 2/1994 | Germany . | |
| 2088520 | 6/1982 | United Kingdom . | |
| 2127129 | 4/1984 | United Kingdom . | |
| 94/25777 | 11/1994 | WIPO | 59/93 |

*Primary Examiner*—David Jones
*Attorney, Agent, or Firm*—Mark P. Stone

[57] ABSTRACT

A shortening claw is linked to a chain by a passage (17) into which a slot (19) opens. The slot (19) extends up to a bent end (20) of the claw back, receives a chain link (29) and supports the front of another chain link (25).

8 Claims, 3 Drawing Sheets

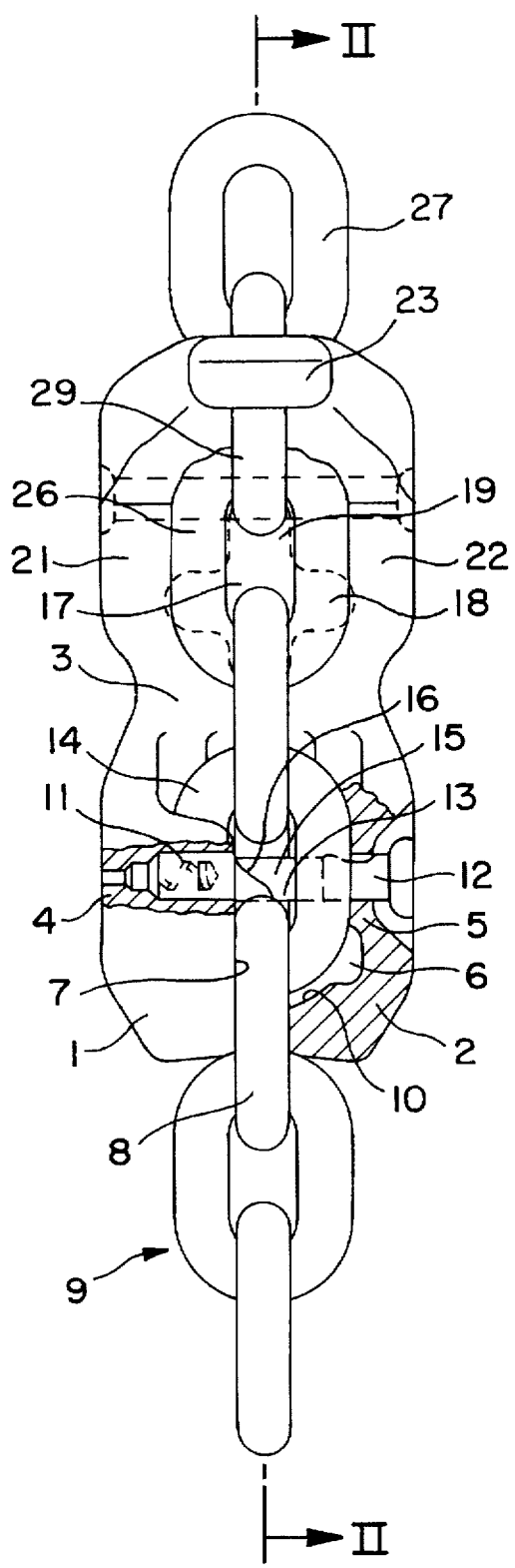
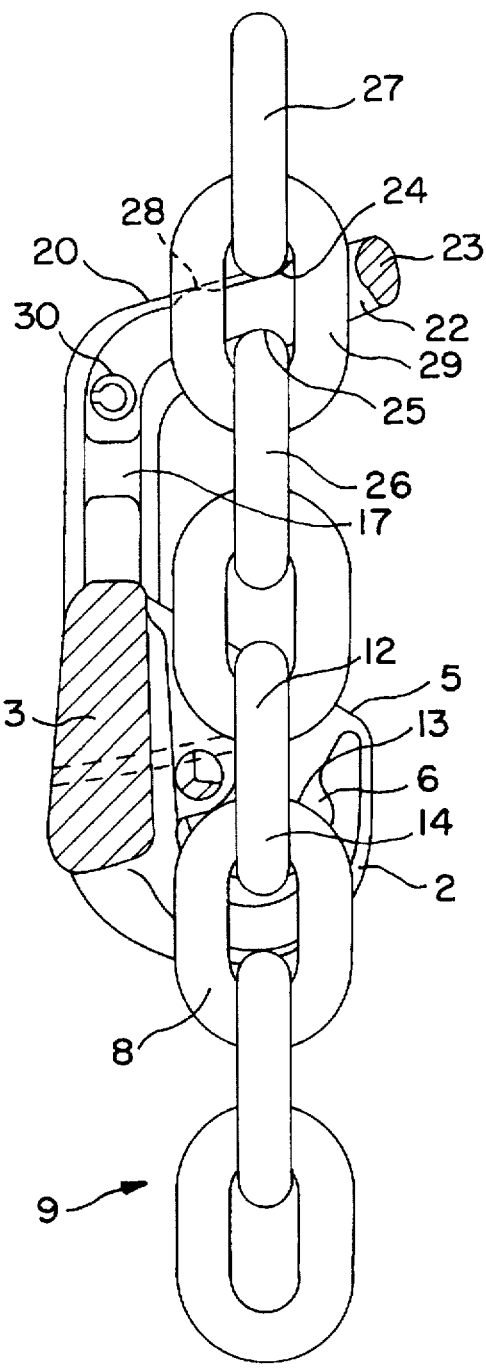
FIG. 1
FIG. 2

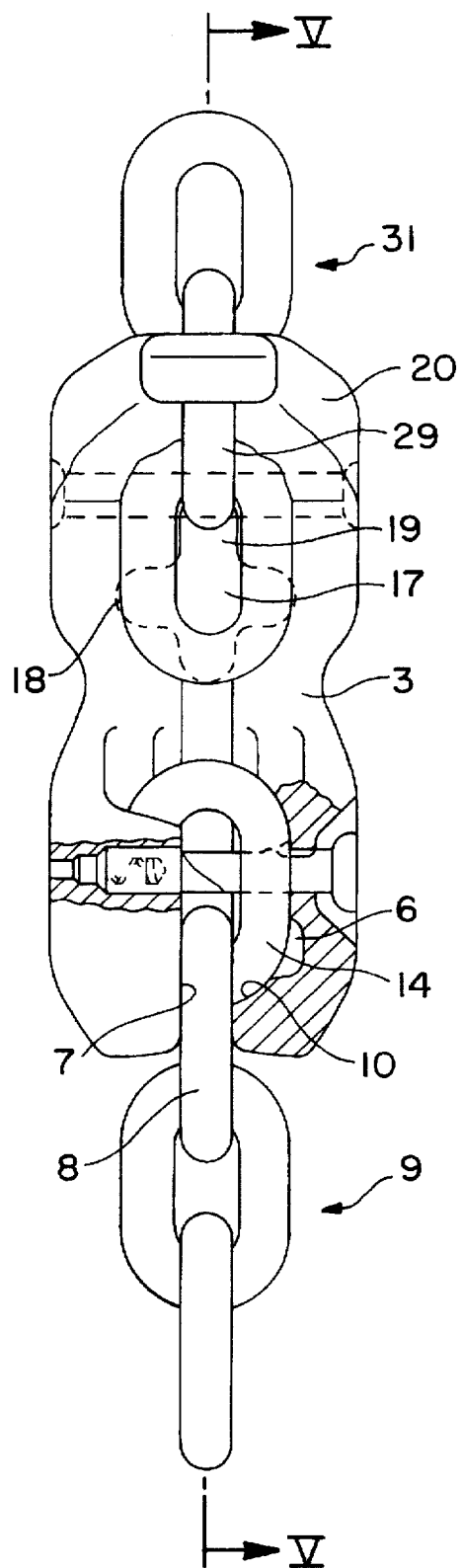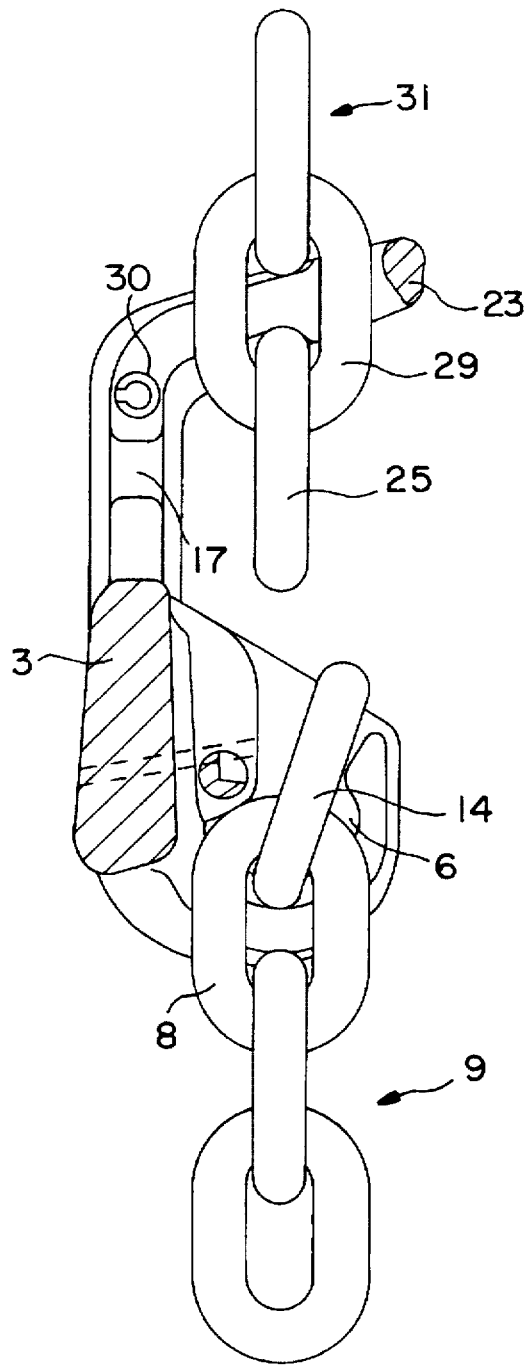
FIG. 4
FIG. 5

SHORTENING CLAW

The invention relates to a double-pronged shortening claw having two hooks which are connected to one another via a back, are arranged essentially parallel to one another and, in the area of their prongs defining an insertion slot for a link of a chain strand, form a pocket for accommodating and supporting a chain link which follows the chain link inserted into the insertion slot, is arranged essentially perpendicularly to the plane of the insertion slot and, to prevent it from hanging undesirably out of the pocket, is secured by a securing element forming a stop for the nose of the chain link inserted into the insertion slot.

Shortening claws of the above type are exceptionally robust and permit not only rapid but also safe shortening of chain strands used for lifting heavy loads, the safety being determined substantially by the receptacle, designed as a pocket for the chain link, put into it in each case, of the shortened chain-strand section. DE 27 12 605 C 2 discloses a shortening claw of the generic category considered, which has a fork head at its end remote from the pocket, which fork head consists of two parallel legs having aligned transverse bores for accommodating a retaining bolt for the end link of a chain-strand section. The fact that the known shortening claw can only be attached to the end link of a chain strand restricts or impedes its possible uses at least inasmuch as there is generally no option in practice, at least in the case of chain suspension attachments, but to connect the chain strand to be shortened to the end link, to which the shortening claw is fastened, of the chain-strand section by an additional coupling element, in which arrangement the end link, to avoid disadvantages which result from its connection to both the shortening claw and the coupling element, has to be designed as a special link having an enlarged inside width compared with the other chain links.

In addition, DE-U-69 03 899 discloses a shortening strap having an essentially L-shaped basic body, the longer leg of which is provided with a bore for the captive attachment of a chain link and with a pull-through opening for a chain strand to be shortened, and the shorter leg of which, on the other hand, has a slot which leads into the pull-through opening and whose side walls serve to support the nose of a chain link of the chain strand to be shortened. In this case, the end of the chain strand which can be shortened and the chain link put into the bore in the shortening strap are connected to a special link, the dimensions of which deviate from the dimensions of the links of the chain strand. On account of the arrangement described, the known shortening strap is not suitable for connecting so-called loose chain-strand ends, which is possible in principle when using a fork-head attachment of the type disclosed by DE-C-27 12 605.

Finally, a shortening claw is known which is suitable both for shortening continuous chain strands and for quickly and temporarily connecting the ends of two chain-strand sections. In this design disclosed by U.S. Pat. No. 3,729,926, a circular pull-through opening is arranged in the straight claw back above a first receptacle, formed by hooks arranged parallel to one another, for a chain link, adjoining which pull-through opening is a slot whose end remote from the pull-through opening is formed by a cross yoke against which the longitudinal leg of a link of a chain strand passed through the pull-through opening is supported, in which arrangement neither the type of support of the chain link nor the type of chain-strand guidance of a continuous chain strand to be shortened is able to provide satisfaction.

The object of the invention is to design a shortening claw of the type considered in such a way that, while dispensing with additional coupling elements for the chain strand to be shortened, it can be installed at a freely selectable point of a chain strand, even of a continuous chain strand. In the case of a shortening claw of the generic type, this object is achieved according to the invention when a pull-through opening for the chain strand having the chain link put into the pocket or a further chain strand which can be connected to this chain strand is arranged above the pocket in the claw back, and when a slot leads into the pull-through opening, which slot has a center plane in common with the center plane of the insertion slot and extends right into an angled end, remote from the pocket, of the claw back, in which arrangement the side walls of this slot, which are connected to one another by a cross yoke at the slot end remote from the pull-through opening, can be utilized for supporting a chain link of the chain strand having the chain link put into the pocket or of the further chain strand which can be connected to this chain strand.

Further details and features of the invention follow from the subclaims and the description below of an especially advantageous embodiment shown in the attached drawing, in which:

FIG. 1 shows, partly in section, the front view of a shortening claw, put into a continuous chain strand, in the unloaded state, FIG. 2 shows a section along line II—II in FIG. 1, FIG. 3 shows a section corresponding to FIG. 2 through the shortening claw according to FIGS. 1 and 2 used for forming a collar chain, FIG. 4 shows, partly in section, the front view of the shortening claw according to FIGS. 1 and 2 used for connecting two chain strands, and FIG. 5 shows a section along line V—V in FIG. 4.

In the figures, 1 and 2 are the prongs of two hooks which are connected to one another via a back 3 of the claw and which form a laterally enclosed pocket 6 together with walls 4 and 5 increasing the carrying capacity of the prongs 1, 2 and connecting the prongs 1, 2 to the claw back 3.

The pocket 6 has an insertion slot 7, open at the front and bottom, for a chain link 8 of a continuous chain strand 9. The base 10 of the pocket 6 is adapted to the shape of the noses of the chain links of the chain strand 9 in order to ensure good supporting conditions. A locking bolt 12 displaceable against the action of a spring 11 forms a stop for the nose 13 of the chain link 8 and prevents the chain link 14 from hanging unintentionally out of the pocket 6. A transverse groove 15 in the locking bolt 12 releases the chain link 8 as soon as the locking bolt 12 is displaced to the left out of the position shown in FIG. 1 against the action of the spring 11. Whereas separate actuation of the locking bolt 12 by the user of the shortening claw is required in order to unlock the locking bolt 12, its displacement when putting the chain link 14 into the pocket 6 is effected automatically by the bottom nose of the chain link 8 being pressed against an actuating ramp 16 which is formed by an inclined surface of the transverse groove 15.

A pull-through opening 17 for the chain strand 9 is arranged above the pocket 6 in the claw back 3, which pull-through opening 17 consists of two crossing slots 18 and 19. The slot 19 is extended right into an end 20 of the claw back 3, which end 20 is bent at an angle of 90°–120°. Its web-shaped side walls 21 and 22 are connects to one another by a cross yoke 23 at the end remote from the pull-through opening 17. Catch hollows 24 and 25 for the chain links 26 and 27 as well as a catch hump 28 impede unintentional displacement of the chain link 29 in the slot 19, while a locking pin 30 reliably prevents this link or the chain strand 9 from sliding back into the area of the pull-through opening 17.

As revealed by FIGS. 1 and 2, the distance between the base 10 of the pocket 6 and the apex of the catch hollow 25 is slightly greater than the sum of three times the pitch and twice the nominal thickness of the links of the chain strand 9. The matching of sizes described ensures that the shortening claw is only loaded when the chain strand 9 is shortened or else is utilized to form a collar chain, as shown in FIG. 3, in which the chain link 14 put into the pocket 6 is supported on the base 10 of the pocket 6 and the chain link 26 is supported against the side walls 21 and 22 of the slot 19.

Finally, FIGS. 4 and 5 show the use of the shortening claw described for connecting the chain strand 9 to a chain strand 31, in which case the chain strand 9 may be shortened according to the respective requirements.

I claim:

1. A double-prong shortening claw having two hooks and a back (3), said two hooks being connected to each other by said back, said two hooks being arranged essentially parallel to each other, and each of said two hooks defining a prong;

said two hooks defining an insertion slot (7) proximate to said prongs (1, 2), said insertion slot (7) adapted to receive a link (8) of a chain strand (9);

said two hooks defining a pocket (6) having side walls (4, 5) for receiving and supporting a chain link adjacent to said chain link received in said insertion slot (7);

said insertion slot (7) being defined along a predetermined plane and said pocket (6) being oriented such that it is essentially perpendicular to said predetermined plane of said insertion slot (7);

a securing element operatively associated with said shortening claw for providing a stop at an end of said chain link received in said insertion slot (7) for securely retaining said adjacent chain link received in said pocket (6);

said shortening claw defining a pull-through opening (17) in said back (3) and oriented above said pocket (6) for said chain strand (9) having said adjacent link (14) received in said pocket (6), or for a second chain strand (31) connectable to said chain strand (9) having said adjacent link (14) received in said pocket (6);

said shortening claw defining an inlet slot (19) leading into said pull-through opening (17), said inlet slot being oriented along a center plane common to a center plane of said insertion slot (7), said back (3) having an angled end (20) remote from said pocket (6), said inlet slot (19) extending into said angled end (20) of said back (3);

said inlet slot (19) being defined by sidewalls (21, 22) and a cross-yoke (23) connecting said sidewalls at an end of said inlet slot (19) remote from said pull-through opening (17), said sidewalls (21, 22) of said inlet slot (19) supporting an end of a chain link (26) of said chain strand (9) having said adjacent link (14) received in said pocket (6) or of said second chain strand (31) connectable to said chain strand (9) having said adjacent link (14) received in said pocket (6).

2. The shortening claw as claimed in claim 1, wherein the pull-through opening (17) is formed by two crossing slots (18, 19).

3. The shortening claw as claimed in claim 1 including a locking element (30) operatively associated with said pull-through opening (17) for securing a chain link (29) inserted into said inlet slot (19) and preventing said chain link inserted in said inlet slot from being displaced proximate to said pull-through opening (17).

4. The shortening claw defined in claim 3, wherein the pull-through opening (17) is formed by two crossing slots (18, 19).

5. The shortening claw as claimed in claim 1 wherein said angled end (20) is oriented at an angle relative to said back (3) in a range of between 90°–120°.

6. The shortening claw as claimed in claim 1, further including at least one catch hollow (24, 25) or at least one catch hump (28) on at least one said side walls (21, 22) defining said inlet slot (19) proximate to said angled end (20) of said back (3).

7. The shortening claw as claimed in claim 1, wherein said securing element comprises a locking bolt (12) reciprocally movable in aligned bores in said prongs (1, 2) defining said insertion slot (7); said shortening claw including a spring (11) opposing movement of said locking bolt from a locking position into a release position; said locking bolt defining a transverse groove (15) which, when said locking bolt is moved into said release position, passes proximate to an end of said chain link (8) received in said insertion slot (7) for releasing said chain link (8) received in said insertion slot (7).

8. The shortening claw as claimed in claim 7, wherein said transverse groove (15) has an inclined surface defining an actuating ramp (16) for said locking bolt (12), said locking bolt (12) being displaceable from said locking position and into said release position as a result of force applied by said actuating ramp (16) to an end of said chain link (8) received in said insertion slot (7) upon insertion thereof into said insertion slot (7).

* * * * *

UNITED STATES PATENT AND TRADEMARK OFFICE
CERTIFICATE OF CORRECTION

PATENT NO. : 5,724,804
DATED      : March 10, 1998
INVENTOR(S): Reinhard Smetz

It is certified that error appears in the above-identified patent and that said Letters Patent is hereby corrected as shown below:

Cover Page - Item [86]

Delete "371 Date: Jul. 11, 1996"

and substitute - -371 Date: June 11, 1996- -.

Delete "102(e) Date: Jul. 11, 1996"
and substitute - -102(e) Date: June 11, 1996- -.

Signed and Sealed this

Sixth Day of October, 1998

Attest:

BRUCE LEHMAN

Attesting Officer    Commissioner of Patents and Trademarks